(12) United States Patent
Rick

(10) Patent No.: US 8,770,334 B2
(45) Date of Patent: Jul. 8, 2014

(54) MOTOR VEHICLE BODY WITH ACTIVE HOOD

(71) Applicant: GM Global Technology Operations LLC, Detroit, MI (US)

(72) Inventor: Ulrich Rick, Braunweiler (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/670,853

(22) Filed: Nov. 7, 2012

(65) Prior Publication Data

US 2013/0119707 A1    May 16, 2013

(30) Foreign Application Priority Data

Nov. 10, 2011 (DE) .......................... 10 2011 118 123

(51) Int. Cl.
*B60K 28/10* (2006.01)
(52) U.S. Cl.
USPC ........................................................ 180/274
(58) Field of Classification Search
USPC ............................ 180/274, 69.21; 296/193.11
IPC ............................................. B60R 21/34,21/38
See application file for complete search history.

(56) References Cited

U.S. PATENT DOCUMENTS

| | | | | |
|---|---|---|---|---|
| 6,474,679 B2 * | 11/2002 | Miyasaka et al. | .......... | 280/730.1 |
| 6,938,715 B2 * | 9/2005 | Hamada et al. | ............... | 180/274 |
| 7,614,472 B2 * | 11/2009 | Kalliske et al. | ............... | 180/274 |
| 8,235,159 B2 * | 8/2012 | Mildner | ......................... | 180/274 |
| 8,307,935 B2 * | 11/2012 | Takahashi et al. | ............ | 180/274 |
| 8,311,701 B2 * | 11/2012 | Iwai et al. | ........................ | 701/36 |
| 2006/0260855 A1 * | 11/2006 | Yoshitake | .................. | 180/69.21 |
| 2010/0307854 A1 | 12/2010 | Mildner | | |

FOREIGN PATENT DOCUMENTS

| | | |
|---|---|---|
| DE | 10138449 A1 | 2/2003 |
| DE | 10353447 A1 | 6/2005 |
| DE | 102004029757 A1 | 1/2006 |
| DE | 102007033796 A1 | 1/2009 |
| EP | 0967128 A2 | 12/1999 |
| EP | 1364846 A2 | 11/2003 |
| JP | H11310158 A | 11/1999 |
| JP | 2009126275 A * | 6/2009 |
| JP | 2011218995 A * | 11/2011 |

OTHER PUBLICATIONS

German Patent Office, German Search Report for Application No. 102011118123.0, dated Jul. 5, 2012.
UK IPO, British Search Report for Application No. 1219107.8, dated Feb. 14, 2013.

* cited by examiner

*Primary Examiner* — Faye M. Fleming
(74) *Attorney, Agent, or Firm* — Ingrassia Fisher & Lorenz, P.C.

(57) ABSTRACT

A motor vehicle body is provided. The motor vehicle body includes a front hood with an outer skin and a stiffening layer arranged under the outer skin and attached to the outer skin. The motor vehicle body also includes an actuator for lifting up the front hood during an accident, which is accommodated in a recess in the stiffening layer.

20 Claims, 3 Drawing Sheets

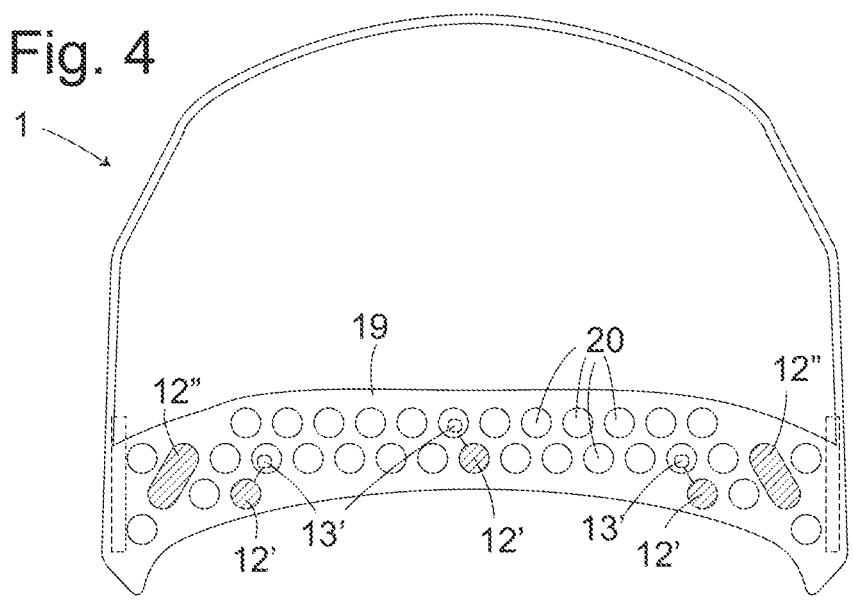
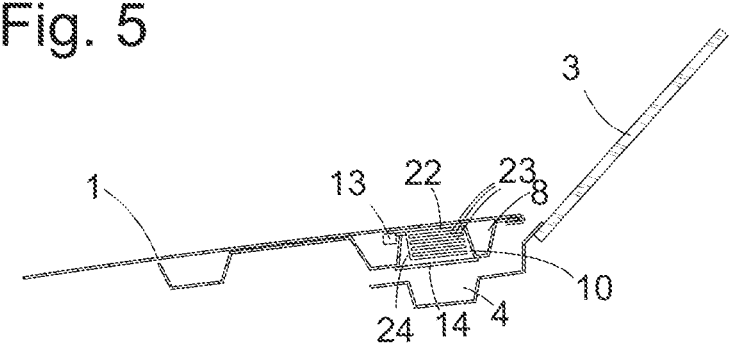
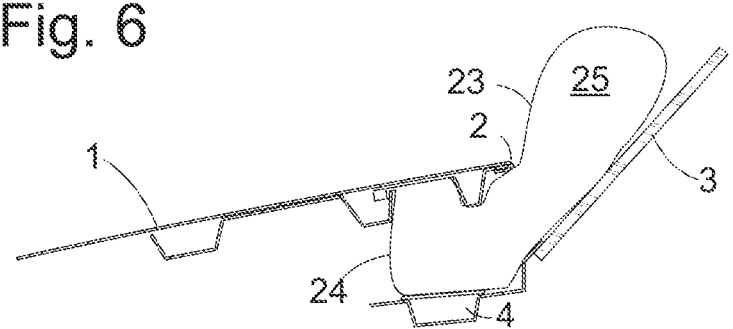

MOTOR VEHICLE BODY WITH ACTIVE HOOD

CROSS-REFERENCE TO RELATED APPLICATION

This application claims priority to German Patent Application No. 10 2011 118 123.0, filed Nov. 10, 2011, which is incorporated herein by reference in its entirety.

TECHNICAL FIELD

The present disclosure relates to a motor vehicle body with a so-called active hood. For example, a hood that can be lifted with the help of at least one actuator in the event of an accident, so as to increase the distance between an outer skin of the hood that can be deformed when absorbing energy and vehicle parts lying under the hood that may be slightly deformable, thereby providing any pedestrian who might be involved in the accident and impacts the hood with a long deceleration distance.

BACKGROUND

In order to impart the stiffness to the hood required to reduce a pedestrian from contacting vehicle parts under the hood, the hood, for example as shown in DE 10 2007 003 796 A1, encompasses a stiffening layer in addition to the outer skin, which is joined with the outer skin along the edges of the latter, and together with the outer skin forms a loadable hollow profile or honeycomb structure.

In this conventional construction, the hood is lifted up by means of an airbag, which is situated on the underside of a hollow profile of the hood, and protected by a soundproofing mat secured to the underside of the hood. When the airbag is inflated during an accident to initiate the lifting movement of the hood, it presses the soundproofing mat downward until it encounters resistance, and then lifts up the hood, spreading out through the gap that here expands between the rear edge of the hood and the windshield and extending over the windshield.

The airbag tightly folded together in numerous layers and the soundproofing mat extending around it require space underneath the hood, which is not available for other fixtures normally provided at this location, such as a radiator tank, windshield wiper arms and their drive.

Accordingly, it may be desirable to provide a motor vehicle body in which accommodating the actuator brings with it fewer limitations with respect to the ability to place other fixtures in proximity to the rear edge of the front hood. In addition, other objects, desirable features and characteristics will become apparent from the subsequent summary and detailed description, and the appended claims, taken in conjunction with the accompanying drawings and this background.

SUMMARY

According to various exemplary embodiments, provided is a motor vehicle body with a hood encompassing an outer skin and a stiffening layer arranged under the outer skin and attached to the outer skin and an actuator for lifting up the front hood during an accident by accommodating the actuator in a recess in the stiffening layer. The recess in the stiffening layer allows the actuator to be placed in a space directly under the outer skin that usually remains empty. The design height economized in this way facilitates the accommodation of other fixtures, in one example a radiator tank and/or parts of a windshield wiper system.

The stiffening layer can upwardly bulge in the recess area, so that it extends near to the front hood or in contact with the latter; it is generally cut out in the area of the recess, so that the actuator can be situated in direct contact with the outer skin, and the installation space available to it is not limited in a vertical direction by the stiffening layer.

The recess is generally provided on a rearward edge of the front hood. If the recess is centrally arranged on the rearward edge, a single actuator can be sufficient for lifting up the rearward edge of the front hood.

Such an actuator is generally elongated in the transverse direction of the vehicle, so as to be able to effectively support an impacting body even if it strikes the hood off-center.

The actuator is generally secured to the front hood, so that it is entirely or at least partially accommodated in the recess when in an idle state, and comes out of the recess while expanding.

The actuator generally encompasses an element that can be expanded by feeding in a pressurized fluid. In one example, if it encompasses a flexible membrane, such an expandable element is best protected against damage by a lid when in an idle state.

The lid can generally swivel around an axis lying in front of the expandable element in the longitudinal direction of the vehicle, so that when the expandable element pushes aside the lid while expanding, an opening comes about between the hood and lid behind the expandable element in the longitudinal direction of the vehicle, through which the element can expand, and which can guide the direction of movement as the element expands.

In an open position, the lid can cover a radiator tank running under the rear edge of the hood, so that the expandable element does not have to expand into the radiator tank in order to hit a surface against which it can be supported for lifting the hood.

It further makes sense for the expandable element to encompass a receiving chamber for the pressurized fluid bordered by a rubbery-elastic membrane. On the one hand, such a membrane permits a very compact structural design for the actuator, which in its idle configuration can disappear completely into the recess of the stiffening layer. In addition, the rubbery elasticity of the membrane can ensure that the latter automatically returns to its idle configuration once the receiving chamber is once again depressurized after a lifting process, so that it can be reused without any expensive repair measures.

In order to help the expandable element spread in the direction of a windshield of the motor vehicle body, the expandable element can exhibit a rear side facing the windshield that is more expandable than its front side facing the engine compartment. In one example, the rear side can exhibit a folded structure.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein:

FIG. 4 is a view analogous to FIG. 3 according to another exemplary embodiment of the present disclosure;

FIG. 5 is a section analogous to FIG. 1 according to another exemplary embodiment of the present disclosure;

FIG. 6 is the front hood from FIG. 5 lifted up;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
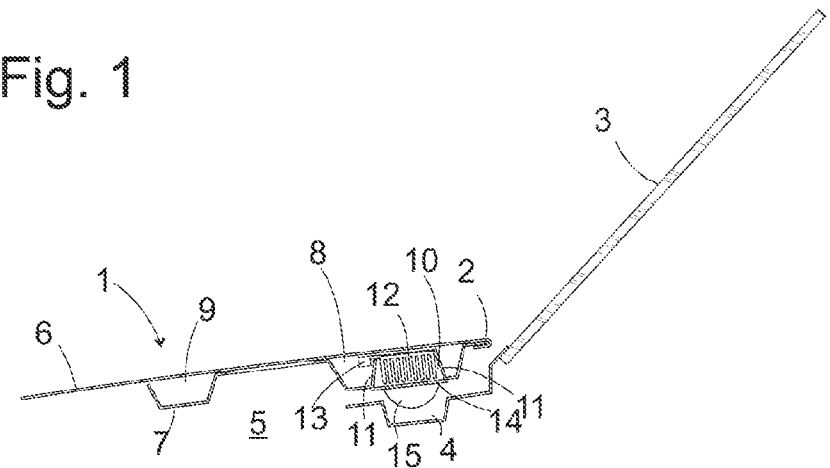
FIG. 1 is a schematic, partial view of an exemplary motor vehicle body according to the present disclosure, which depicts a rear area of a front hood as well as a lower area of a windshield adjacent to the front hood in an idle state.

In a section along a vertical sectional plane extending in the longitudinal direction of the motor vehicle, FIG. 1 shows a rear area of a front hood 1 of a motor vehicle body and a windshield 3 adjoining the rear edge 2 of the front hood 1. At the base of the windshield 3 and covered by the front hood 1, a radiator tank 4 extends over the entire width of the windshield 3 and front hood 1, so as to collect rainwater running off the windshield 3 and divert it to the side, so that it cannot advance into an engine compartment 5 covered by the front hood 1.

In a manner known in the art, the front hood 1 is comprised of an outer skin 6 most often comprising a sheet metal and a stiffening layer 7 covered by the outer skin 6, which can also comprise a sheet metal. There are a variety of ways to three-dimensionally shape the stiffening layer 7 to give it a high resistance to deformation. One known way involves introducing oblong grooves in the stiffening layer 7 along the edges of the front hood 1, which in the completely assembled state of the front hood 1 are enhanced by the outer skin 6 extending over them to form hollow profiles. One such hollow profile that extends directly along the rear edge 2 is marked 8 on the figure; other hollow profiles crossing the hood 1 spaced apart from its edges can be provided, such as those marked 9 on FIG. 1.

Figure 3:
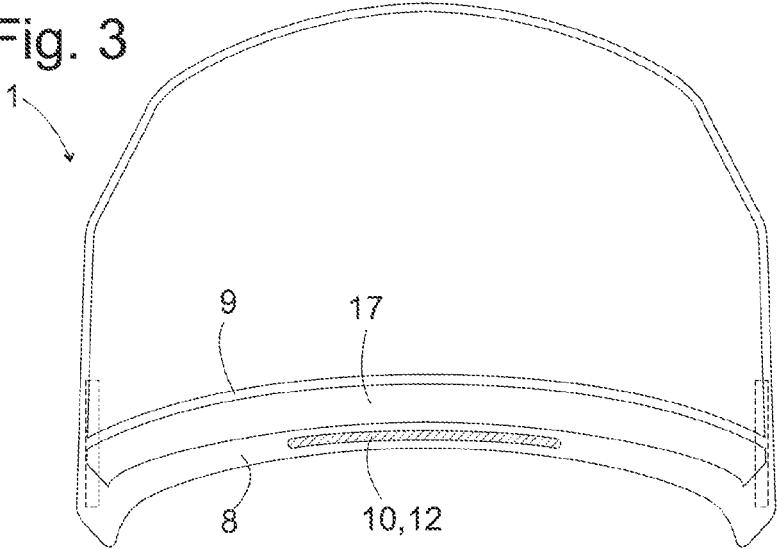
FIG. 3 is a schematic view of the front hood from below.

The hollow profile 8 extending over the entire width of the front hood 1 has an oblong recess 10 whose outlines are visible on FIG. 3 formed in it over a portion of its length in a central region. The recess 10 is here obtained by cutting an opening in the lower flank of the hollow profile 8 formed by the stiffening layer 7, and upwardly diverting the areas of the flank that envelop the opening, so as to create lateral walls 11 of the recess 10.

An expandable element 12 is mounted in the recess 10. An airbag known in the art is possible as the expandable element 12, and its flexible walls comprise a substantially inextensible fabric. Since such an airbag must be suitably folded so that it can expand in the intended manner during an accident, and the folding pattern determines the shape of the airbag in the idle state, it is difficult to make efficient use of the space available in the recess 10 with an airbag, as a result of which the airbag might not fit completely into the space available in the recess 10, and a portion thereof might downwardly protrude out of the recess 10 even in the idle state.

In one exemplary embodiment, the walls of the expandable element 12 therefore comprise a rubbery-elastic material, whose walls widen during expansion. Since these can be folded in a less complicated way than the airbag membrane, they enable a better use of the available installation space. In addition, if its walls are elastic, the expandable element 12 can automatically return to its resting configuration after expansion, so that it can be reused, requiring at most that the source of gas used to expand the element is replaced.

A pyrotechnic gas generator 13 is here provided as one such source. The illustration on FIG. 1 shows the latter inside the hollow profile 8; to make it easier to replace, however, it is best that the gas generator 13 be located in the same recess 10 as the expandable element 12 or an adjacent recess.

The expandable element 12 is protected by a lid 14 that seals the recess 10 from below. The lid 14 is wider than the radiator tank 4 extending underneath it. Its exposed underside can bear projections 15, e.g., ribs extending parallel to the sectional plane, which do not expand quite as much in the longitudinal direction of the vehicle than the radiator tank 4.

Figure 2:
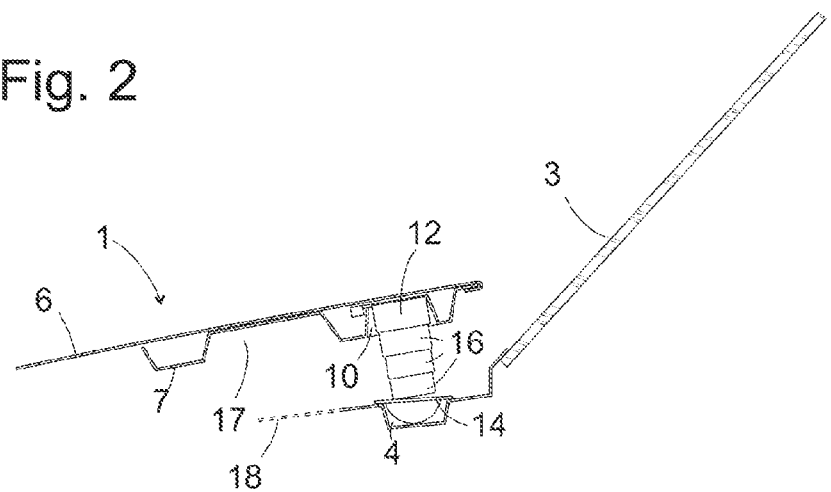
FIG. 2 is a section analogous to FIG. 1, which depicts the front hood lifted up during an accident.

FIG. 2 shows the expandable element 12 in the expanded state. Wall sections 16 of the expandable element 12 are folded together like an accordion in the idle state on FIG. 1, and here extended, keeping the lid 14 that was split off of the recess 10 pressed against the radiator tank 4, so that the lid 14 forms a thrust bearing upon which the expandable element 12 can be supported so as to press up the front hood 1. By moving into the radiator tank 4, the projections 15 can here be used to position the lid 14 in such a way that it protrudes toward the front and back over the radiator tank 4, and rests securely on its edges. In a simplified variant, the lid 14 could also be omitted; in this case, the element 12 would first have to expand up to the floor of the radiator tank 4 before encountering a thrust bearing for support so that it can lift up the front hood 1.

FIG. 3 shows a schematic view of the front hood 1 from below. Depicted is the hollow profile 8 with the oblong recess 10 centrally arranged inside of it. The expandable element 12 can have a floor area adjusted to the recess 10, and fill out the entire surface area of the recess 10, as denoted by the hatched lines on FIG. 3. It would also be conceivable, for example, to keep space available at one or both ends of the recess 10 for a gas generator to feed the expandable element, or to provide two expandable elements to the right and left of a gas generator centrally arranged in the recess 10.

In another exemplary embodiment, the expandable element can be accommodated in the large recess 17 extending between the hollow profiles 8, 9. The recess 17 is so spacious that it is enough for the expandable element to fill only a portion of its surface area. As a consequence, it may make sense to secure the expandable element in the recess 17 if it lies a slight distance opposite a surface fixed in place on the body, as marked 18 on FIG. 2, which can support the element 12 in an expanded state.

Also known in the art is a front hood with an outer skin and stiffening layer, which is deformed at least locally by a honeycomb structure formed in the stiffening layer 7. For example, such a honeycomb structure can be formed as depicted on FIG. 4 by incorporating into an area 19 of the stiffening layer 7 running at a distance underneath the outer skin 6 a plurality of cylindrical or conical recesses 20, whose upwardly directed tips each support the outer skin 6. Some of these recesses 20 can be selected for integrating an expandable element 12', this time with a circular cross section, while other, adjacent recesses 20 provide space for the gas generators 13' that feed the expandable elements 12'.

Also conceivable is to blend several of the recesses 20 arranged in a regular grid, so that a respective expandable element 12'' with a larger floor area and correspondingly greater actuating power can be accommodated into the latter.

FIG. 5 shows another exemplary embodiment of the present disclosure in a section analogous to FIG. 1. While wall segments 16 folded like an accordion in the exemplary embodiment on FIGS. 1 and 2 are oriented substantially perpendicular to the outer skin 6 so as to facilitate an expanding motion primarily perpendicular to the front hood 1, the expandable element 22 on FIG. 5 exhibits accordion-like, folded together wall segments 23 that are substantially oriented parallel to the outer skin 6, and create a flank of the expandable element 22 that faces the windshield 3 in the idle position. A front flank 24 of the expandable element 22 is only slightly folded, or not at all. One consequence of this structure for the expandable element 22 is that the rear flank is significantly easier to stretch during expansion than the front flank 24. After the expansion of the element 22 has lifted the front hood 1 up to a stop position depicted on FIG. 6, the wall segments 23 are deployed through the wide gap obtained in this way between the rear edge 2 and windshield 3, so as to form a cushion 25 that covers the lower region of the windshield 3.

Figure 7:
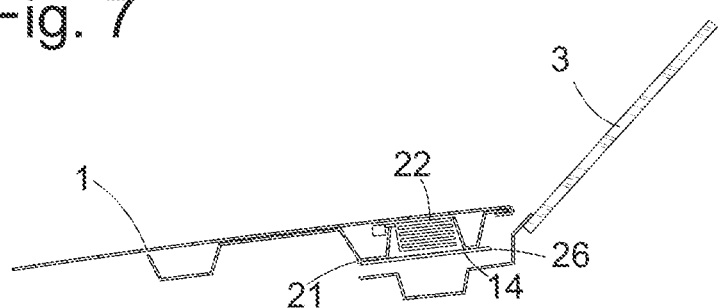
FIG. 7 is a section analogous to FIG. 1 according to another exemplary embodiment of the present disclosure.
Figure 8:
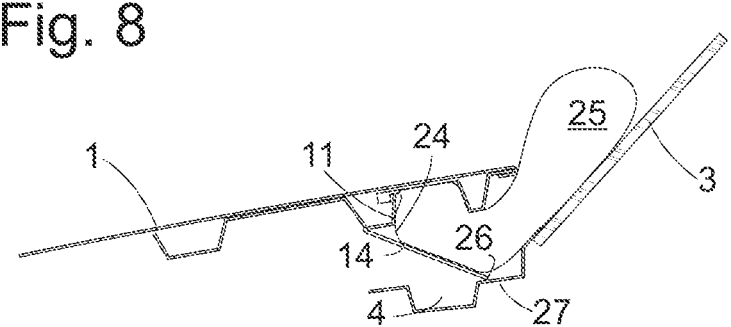
FIG. 8 is the front hood from FIG. 7 lifted up.

FIG. 7 and FIG. 8 show a further development of the exemplary embodiment of FIGS. 5 and 6, specifically in the respective idle state or expanded state. The expandable element 22 is the same as in the exemplary embodiment considered previously. The lid 14 that seals the recess 10 of the expandable element 22 can be swiveled around an axis 21, which extends from the recess 10 in the transverse direction of the vehicle. When the element 22 expands, it presses the edge 26 of the lid 14 furthest from the hinge downward, until it hits the radiator tank 4 or, as shown on FIG. 8, a step 27 extending between the lower edge of the windshield 3 and radiator tank 4. Already a slight expansion of the element 22 is thus already sufficient for moving the lid 14 into the stop position, in which the front hood 1 is lifted by the continued expansion of the element 12.

Since the lid 14 in conjunction with the front lateral wall 11 of the recess 10 prevents the element 22 from expanding forward, the latter can only spread out in the direction of the windshield 3, and take the form of a cushion 25 on it. The front flank 24 of the expandable element 22 is prevented from excessively stretching by virtue of the fact that it already establishes frictional contact with the lateral wall 11 and lid 14 in an early phase of expansion.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A motor vehicle body, comprising:
   an outer skin;
   a front hood encompassing a stiffening layer arranged under the outer skin and attached to the outer skin;
   an actuator for lifting up the front hood during an accident, wherein the actuator is housed in a recess in the stiffening layer and configured to project downward; and
   a lid covering the actuator when the actuator is in an idle state, the lid configured to project downward from the front hood when the actuator is expanded.

2. The motor vehicle body according to claim 1, wherein the stiffening layer is cut out in the area of the recess.

3. The motor vehicle body according to claim 1, wherein the recess is provided on a rearward edge of the front hood.

4. The motor vehicle body according to claim 3, wherein the recess is centrally arranged on the rearward edge.

5. The motor vehicle body according to claim 1, wherein the actuator is elongated in the transverse direction of the vehicle.

6. The motor vehicle body according to claim 1, wherein the actuator is secured to the front hood.

7. The motor vehicle body according to claim 6, wherein the recess lies opposite a surface fixed in place on the body.

8. The motor vehicle body according to claim 6, wherein the actuator encompasses an expandable element that is expandable by feeding in a pressurized fluid.

9. The motor vehicle body according to claim 8, wherein the expandable element is protected by the lid in the idle state.

10. The motor vehicle body according to claim 9, wherein the lid is movable around an axis lying in front of the expandable element in the longitudinal direction of the vehicle.

11. The motor vehicle body according to claim 9, wherein the lid covers a radiator tank in the open position.

12. The motor vehicle body according to claim 8, wherein the expandable element encompasses a receiving chamber for the pressurized fluid bordered by a rubbery-elastic membrane.

13. The motor vehicle body according to claim 12, wherein the expandable element exhibits a front side and rear side, and that the rear side is more expandable than the front side.

14. A motor vehicle, comprising:
   a body having an outer skin;
   a front hood encompassing a stiffening layer arranged under the outer skin and attached to the outer skin;
   an actuator including an expandable element for lifting up the front hood during an accident,
   wherein the actuator is housed in a recess in the stiffening layer and configured to project downward; and
   a lid covering the actuator when the actuator is in an idle state, the lid configured to project downward from the front hood when the actuator is expanded.

15. The motor vehicle according to claim 14, wherein the recess is provided on a rearward edge of the front hood.

16. The motor vehicle according to claim 15, wherein the recess is centrally arranged on the rearward edge.

17. The motor vehicle according to claim 15, wherein the actuator is elongated in the transverse direction of the vehicle.

18. The motor vehicle according to claim 15, wherein the expandable element is expandable by feeding in a pressurized fluid.

19. The motor vehicle according to claim 18, wherein the expandable element encompasses a receiving chamber for the pressurized fluid bordered by a rubbery-elastic membrane.

20. The motor vehicle according to claim 19, wherein the expandable element exhibits a front side and rear side, and that the rear side is more expandable than the front side.

* * * * *